May 26, 1959  J. S. MEARS  2,888,537
THERMOSTAT AND SPACE HEATER CONTROL
Filed March 17, 1958

INVENTOR.
John S. Mears
BY
Ramsey and Kolisch
Attys.

United States Patent Office 2,888,537
Patented May 26, 1959

2,888,537

THERMOSTAT AND SPACE HEATER CONTROL

John S. Mears, Oswego, Oreg.

Application March 17, 1958, Serial No. 722,088

14 Claims. (Cl. 200—138)

This invention relates to thermosensitive control units, and more particularly to an improved thermostat construction such as may be used in regulating space heaters or other loads. Included in the invention is the combination of control unit, space heater, and connections whereby sensitive heat regulation is obtained, with provision for isolating the heater from its electric source during cutoff. The control unit is economical to manufacture, but is safe and highly practical in operation.

Generally, it is an object of this invention to provide an improved thermostat which readily responds to small temperature changes, and which is easily and accurately adjusted to give requisite temperature control at different temperature levels.

Still another general object is to provide a thermostat construction which is not only sensitive and accurate, but also is characterized by a relatively compact construction which is ideally suited for wall mounting.

A still further general object is to provide a thermostat of the type described which includes easily accessible mechanism for making any tuning adjustments in heat response which may be necessary at, or after installation.

The thermostat unit of this invention comprises a single, elongated thermosensitive strip means secured in an appropriate manner to a support frame or plate. The strip means includes an activating portion movable in response to a temperature change. On one side of the strip means are a pair of switches, each having actuating members or parts for actuating the switches which project toward the activating portion of the strip means. The activating portion of the strip means is part of the thermal means in the device for actuating the switches. On the other side of the thermosensitive strip means is a unique, double cam mechanism providing a mechanical means for moving the activating portion of the strip means. The cams of the double cam mechanism have different cam offsets, and contact in sequence the strip means at points spaced along its length. The cam mechanism, for a given speed of rotation, operates to adjust the position of the activating portion at two different rates of speed.

The construction has a number of advantages. It can be employed, for instance, in regulating a space heater fed from two supply conductors. Some municipal building codes require that such space heaters be completely isolated from their supply when their controls are turned to an "off" position. The thermostat of this invention may be connected with each of the switches of the unit in series with a separate one of the heater supply conductors. When set up in this manner, one cam may be used in regulating the range of temperature response in the unit, while the other may be employed positively to open up both switches so that the space heater is completely cut off from a hot wire connection.

It is contemplated that the thermosensitive strip means be mounted on an elongated frame plate, with the strip means extending longitudinally along one side of the plate and spaced closely adjacent the plate. A cover portion is fitted over the frame plate and strip means, and the cover portion is perforated to allow the passage of air therethrough. This part of the unit is mounted in a room outwardly from the wall and in an exposed position. The switches of the unit are secured to the other side of the frame plate, and are positioned so that they may be inserted within the hollow interior of a conventional electrical outlet box. The organization produces a compact design without sacrifice of temperature sensitivity.

The thermosensitive strip is mounted between the cover and frame plate with a portion thereof spaced closely adjacent the cover so as to allow air circulation between the strip and frame plate. The remainder of the strip is spaced closer to the frame plate, but a slight distance away from the plate. This enables the mounting of the cam mechanism intermediate the strip means and the cover portion. A chimney type action is produced wherein air tends to be drawn up behind the thermosensitive strip means, thereby to cause better temperature response in the unit. In some instances a heater may be inserted behind the strip means, to accentuate the chimney action, and also for the purpose of heating the strip means slightly. Heating of the strip means is sometimes desirable, since usually the walls of a room are somewhat cooler than the room center, and advanced heating of the strip means creates better temperature response.

Other features, objects, and advantages are present in the invention, as will become more fully apparent from the following description read in conjunction with the accompanying drawings wherein.

Figure 1:
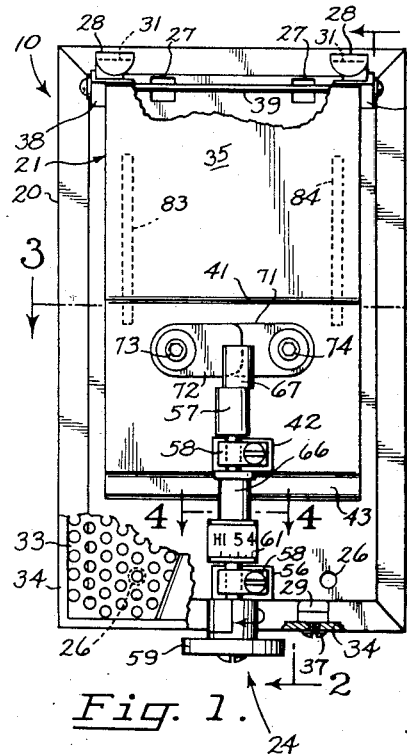
Fig. 1 is a front plan view of a thermostat unit, with portions broken away to illustrate details of the cam mechanism.

Referring now to the drawings for a description of a specific embodiment of this invention, and more particularly to Figs. 1, 2 and 3, 10 indicates a thermosensitive control unit generally, comprising a frame plate 20, an elongated thermosensitive strip means 21 secured at one end to plate 20 and extending over one side of the plate, a pair of switches 22 and 23 secured to the other side of the plate, and a rotatable cam mechanism 24 mounted over a portion of the front face of strip means 21.

Frame plate 20 has a rectangular outline, and is provided with a pair of bores 26 at the base thereof which accommodate screws used in fastening the plate in position on a wall. The upper end of the plate has a pair of hanger slots 27, and laterally outwardly of the hanger slots a pair of mounting posts 28. At the lower end of plate 20 are a second pair of mounting posts 29. Transversely extending locking grooves 31 are indented into outer extremities of mounting posts 28. Locking grooves 31 snap about a rib 32 of a cover assembly comprising a trim ring 34 and a perforated cover wall or face panel 33, which is fitted over the outer side of the frame plate. The cover assembly rests on the outer ends of posts 28, 29. The lower end of the cover assembly is secured in place by a screw 37.

Trim ring 34 and perforated cover wall or face panel 33 are separable from each other. The nonintegral construction used for the cover assembly permits separation of the face panel from the trim ring, thus facilitating painting or substitution of the face panel.

Face panel 33 defines the forward limits of a mounting chamber for strip means 21. The rear limits of the chamber are defined by the front side of frame plate 20. This chamber is relatively thin, as compared to the length and breadth of the chamber, which are measured in directions parallel to the face of the front face of plate 20.

Thermosensitive strip means 21 comprises a thermosensitive or bimetal strip 35 pivotally connected at its upper end by a pivot bar 39 to projections 38 of plate 20 spaced laterally outwardly of mounting posts 28. The upper end of the strip is spaced a relatively large distance from the frame plate and closely adjacent face panel 33. Progressing downwardly from the upper end of the strip, the strip slopes inwardly toward the frame plate until reaching a crease 41. After reaching crease 41, the strip progresses downwardly to the base of the unit in substantially parallel alignment with the frame plate, but spaced a small distance therefrom. A support post 42 integral with plate 20 projects through an accommodating aperture made in the thermosensitive strip near its bottom end. Along the base of the strip there is provided a shoulder 43 which projects outwardly toward panel 33.

Switch mechanisms 22, 23 are conventional, micro-type switches. Each includes a pair of terminals 47, 48, and an actuating button or member 46 projecting out of the body of the switch mechanism toward the inner face of the thermosensitive strip. Each button 46 is spring biased to a position fully extended from the body of the switch mechanism, and in this position a closed condition exists between terminals 47, 48. Depressing the button of a switch causes the connection between terminals 47, 48 to open, after the button has traveled a certain distance. The switch mechanisms are mounted on the rear side of frame plate 20 by nut and bolt assemblies 49 extending through the body of the switch mechanisms and a flange 51 integral with frame plate 20. Paper shields 52 are disposed along the sides of the switch mechanisms.

At the base of the frame plate is a second support post 56 which cooperates with post 42 in mounting the cam mechanism 24. Cam mechanism 24 includes an elongated cam shaft 57 rotatably mounted in the ends of support posts 42, 56, and retained on the ends as by clips 58. The lower end of the cam shaft extends outwardly of the mounting chamber defined by face plate 33 and frame plate 20, and has nonrotatably affixed thereto an adjuster knob 59. Affixed to the cam shaft intermediate support posts 42, 56 is a dial 61, viewable through a suitable aperture (not shown) provided in face plate 33.

Integral with and thereby joined with cam shaft 57 are a pair of cams, a lower cam 66 and an upper cam 67. The lower cam is spaced next to and engages shoulder 43. The upper cam 67 is located at the end of shaft 57 and below the inclined portion of strip 35.

Considering again strip means 21, a brace plate 71 and a cushioning spring 72 are secured to the perpendicular portion of strip 35 in the vicinity of the end of shaft 57. Spring 72 has its left end in Fig. 1 fastened to the thermosensitive strip. The right end of the spring in Fig. 1 is free of the strip and spaced outwardly therefrom. The free end of the spring yieldably resists pressure exerted inwardly toward the face of strip 35.

At either end of brace plate 71 and turned into threaded bores provided at each end of the plate are a pair of screw elements 73, 74. The inner ends of these screw elements constitute adjustable abutments, and each of these inner ends register with one of the actuating buttons of the switches 22, 23. By adjusting the amount a screw projects inwardly from the inner face of strip 21, the movement required of the center portion of the thermosensitive strip inwardly toward the switch mechanisms to open a switch may be controlled.

From the above description, it will be seen that the thermosensitive strip means is retained in place at its upper end by a pivot connection. The lower or pivoting portions of the strip means are urged in a clockwise direction in Fig. 2 by the spring bias provided actuating buttons 46. Pivotal movement of the strip means is limited either by shoulder 43 engaging cam 66, or by spring 72 striking cam 67. The portion of the thermosensitive strip means which includes spring 72 functions as the activating portion of the strip means. This moves toward and away from the switch mechanisms in response to a temperature change and strip 35 becomes more bowed with an increase in temperature. The position of the activating portion may also be adjusted mechanically, by rotation of the cam mechanism 24.

Figures 2, 3, 4:
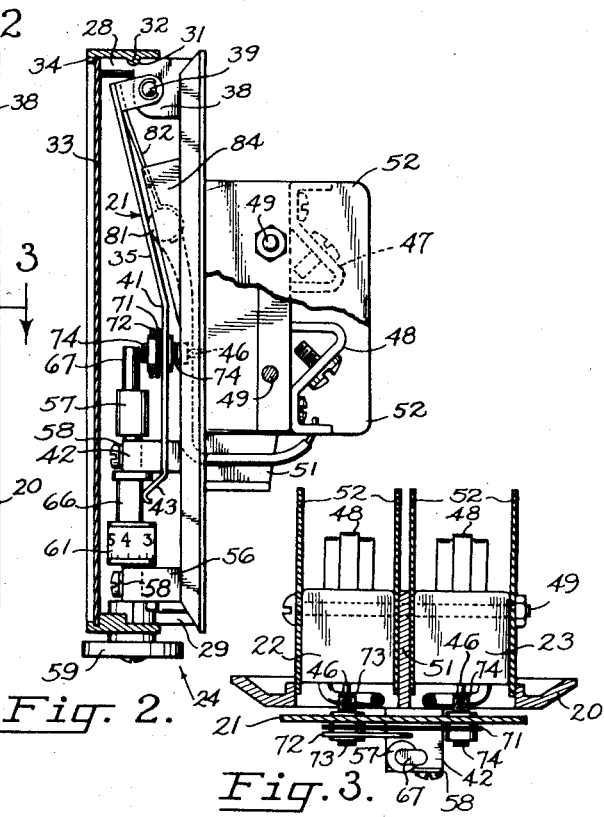
Fig. 2 is a section view along the line 2—2 in Fig. 1.
Fig. 3 is a section view along the line 3—3 in Fig. 1.
Fig. 4 is a section view along the line 4—4 in Fig. 1 showing one of the cams in the cam mechanism.

Referring to Figs. 3 and 4, it will be seen that the cam surface of cam element 66 (the bottom curved surface of cam 66 in Fig. 4) has a smaller cam offset than the cam surface of cam 67 (the bottom surface of cam 67 in Fig. 3). That is, the surface of cam 66 is pitched at a slighter angle and extends outwardly from the axis of the cam shaft a shorter distance than the cam surface of cam 67. Further, cam 66 moves ahead of cam 67 when the cam shaft is rotated in a clockwise direction in Figs. 3 and 4. The cams thus engage strip means 21 in sequence, and for a given rate of rotation, produce different rates of movement of the center or activating portion of strip means 21. Cam 66 moves the activating portion at a relatively slow rate, and is used in adjusting the level of temperature response in the unit. Cam 67 moves the activating portion sharply toward the switches, and is used in positively opening both switches.

Connected across terminals 48 of the two switches is a heater 81. This heater is mounted at the upper end of strip 35 behind the sloping portion of the strip. The heater is held in position by a spring clip 82, which is fastened securely at its upper end to the top of strip 35. The heater is spaced between a pair of triangular shaped flanges 83, 84 integral with frame plate 20 and spaced underneath strip 35 on laterally opposite sides thereof. The heater heats the space between strip 35 and the frame plate and tends to cause a current of air to pass upwardly behind the inner face of strip 35.

Figure 5:
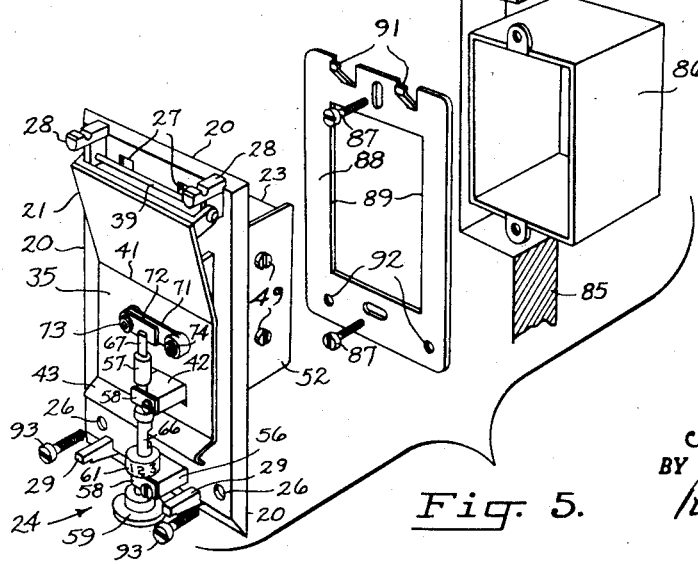
Fig. 5 is an exploded view showing how the unit may be mounted on a wall by securing it to an electrical outlet box.

Control unit 10 may be mounted on a wall using a conventional electrical outlet box. Referring to Fig. 5, outlet box 86 is mounted on a wall 85 in the usual wall cavity prepared in the wall to accommodate the outlet box. Affixed by screws 87 to the forward side of box 86 is a mounting plate 88. The mounting plate contains an aperture 89 communicating with the hollow interior of box 86. The mounting plate also is provided with hanger tabs 91 and threaded bores 92. Tabs 91 hook into hanger slots 27 of frame plate 20 and hold the upper end of the unit in place. The base of the unit may be secured in position using screws 93 passing through bores 26 and turned into threaded bores 92. When mounted in this way, the bodies of switches 22, 23 project into the interior of outlet box 86, whereas thermosensitive strip means 21 is held outwardly of the room wall in a position to respond to ambient temperature changes.

Figure 6:
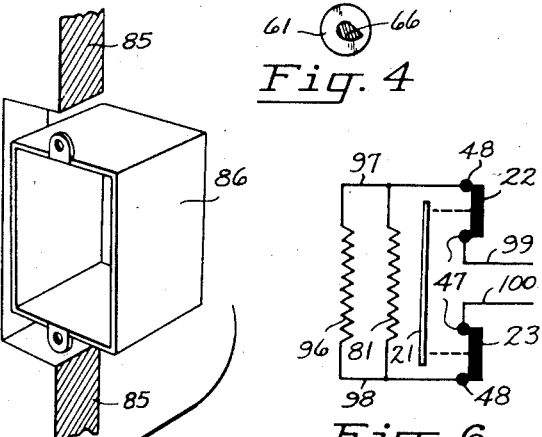
Fig. 6 is a schematic drawing showing the unit as it may be connected for the purpose of regulating a space heater.

Fig. 6 illustrates how the unit may be connected to a space heater to give safe and accurate control of temperature. The space heater is indicated schematically at 96. Supply conductors 97, 98 connect opposite sides, respectively, of heater 96 to terminals 48 of switches 22, 23. Strip heater 81 is also connected to these terminals. Source conductors 99, 100 are connected to terminals 47 of the switches. Thus each of the supply conductors of the space heater has connected in series therewith one of the switches of the unit.

When set up in this way, screws 73, 74 are set so that one of the switches 22, 23 is opened only with the activating portion fully depressed toward frame plate 20, whereas the other of the switches is opened with the activating portion only partially depressed.

The operation of the space heater and control is as follows: Knob 59 is turned to adjust the spacing of the activating portion of strip means 21 relative to the switch mechanisms placed therebehind. With the cam mechanism positioned as in Figs. 1, 2, and 3, the surfaces of cams 66, 67 are spaced substantially at their greatest distances from frame plate 20. Actuating members 46 are fully extended. Both the switches are closed, and a relatively high temperature must be reached before strip 35 bows enough to actuate one of the switches, thereby to open the switch. The thermostat is set for high heat.

For lower heats, shaft 57 and its cams are rotated in the direction of the arrow in Fig. 1 (in a clockwise direction as viewed in Figs. 3 and 4). This causes the cam surface of cam 66 to push against shoulder 43 thereby to move thermosensitive strip means 21 toward frame 20. Initially only cam 66 engages strip means 21, and the movement of the activating portion of the strip means for a given amount of rotation of the cam shaft is relatively small. This enables close control of the level of temperature response of the thermostat.

To turn the heater off, cam shaft 57 is rotated until cam 67 moves into engagement with spring 72 and assumes a position normal to the spring. In this position, the end of cam 67 presses down on the activating portion of strip means 21 directly over switches 22, 23. Both switches are opened. With cam 67 in this position, cam 66 has moved so that its flat side is disposed over shoulder 43, which frees the cam from shoulder 43. This enables the free or bottom end of strip 35 to move with temperature changes, without affecting the open condition of switches 22, 23. Switches 22, 23 are opened with relatively little turning of shaft 57, by reason of the relatively large cam offset of cam 67.

When the thermostat is turned to an "off" position, the heater or load is completely isolated from source conductors 99, 100. This is a requirement of certain municipal building codes, and a safety feature.

The thermostat may be used with circuits other than the one described. For instance, in some cases it may be desirable to control two heaters with separate sources of supply, or a pair of heaters having the same supply but operating at different temperature levels. In these instances, each switch would be placed in series with one of the two supply conductors of each heater, with the other supply conductor connected directly to a current source. Proper adjustments would be made in the position of screws 73, 74 to cause the switch associated with each to open at the requisite time.

It will be noted in the embodiment illustrated that the thermosensitive strip, which is the heat responsive element in the device, is carried outwardly of the frame plate, where it can properly respond to ambient temperature changes, while the bodies of the switch mechanisms are carried within the confines of an outlet box. As a result, a relatively thin cover can be used which projects only a small distance into a room. This contributes to a sightly appearance, and is less hazardous than constructions which protrude outwardly a substantial amount.

While the upper end of the thermosensitive strip is spaced as far as possible from the frame plate for circulation reasons, the lower portion of the strip is spaced relatively closely to the frame plate, so as to accommodate the inclusion of the cam mechanism intermediate the thermosensitive strip and the face panel of the cover. The cam mechanism of the invention is of relatively simple design, occupies little space, and is readily mounted within the confines of the cover assembly.

While there has been described an embodiment of the invention, it should be understood that changes in the arrangement and/or parts are possible without departing from the invention. It is desired to cover all modifications and variations which would be apparent to one skilled in the art and that come within the scope of the appended claims.

It is claimed and desired to secure by Letters Patent:

1. Thermosensitive control apparatus comprising a frame, thermosensitive means mounted in said frame having a switch activating portion movable in response to a temperature change, at least a pair of switches each having an actuating member for actuating the switch mounted in said frame with said actuating members projecting toward the activating portion of said thermosensitive means and activated by movement of said activating portion, and a rotatable cam mechanism mounted adjacent said thermosensitive means for producing mechanically movement of said activating portion, said cam mechanism having a pair of cam surfaces each of which is engageable with said thermosensitive means, said cam surfaces being positioned and arranged to engage said thermosensitive means in sequence upon rotation of said cam mechanism.

2. Thermosensitive control apparatus comprising a frame, thermosensitive means mounted in said frame having a thermally movable switch activating portion moving in a path in response to a temperature change, a switch having an actuating member for actuating the switch mounted with the actuating member in the path of movement of said activating portion, a cam shaft having a pair of cams mounted adjacent said thermosensitive means, one of said cams engaging said thermosensitive means and moving the same positively to actuate said switch, the other of said cams adjusting the position of said thermosensitive means to vary the extent of thermal movement required in said activating portion to actuate the switch.

3. Thermosensitive control apparatus comprising a frame, thermosensitive means mounted in said frame having a switch activating portion movable in response to a temperature change, at least a pair of switches each having an actuating member for actuating the switch mounted in said frame on one side of said thermosensitive means with the actuating members projecting toward said one side at the activating portion thereof, said thermosensitive means having a plurality of adjustable abutments projecting from said one side, one registering with each of said actuating members, and a rotatable cam mechanism mounted adjacent said thermosensitive means for producing mechanically movement of the activating portion toward said switches, said cam mechanism having a pair of cam surfaces each of which is engagable with said thermosensitive means, said cam surfaces being positioned and arranged to engage said thermosensitive means in sequence upon rotation of said cam mechanism.

4. Thermosensitive control apparatus comprising a frame, an elongated thermosensive strip secured at one end to said frame and with its other end free of said frame, said strip having an activating portion movable in response to a temperature change spaced intermediate its ends, at least a pair of switches each having an actuating member for actuating the switch mounted in said frame on one side of said strip with the actuating members projecting toward said one side at the activating portion of the strip, and a cam mechanism for producing mechanically movement of said activating portion, said cam mechanism comprising a cam shaft rotatably mounted in said frame having portions spaced adjacent the activating portion and said other end of said strip, respectively, and a pair of cams nonrotatably joined to said cam shaft, one on the portion of said cam shaft adjacent said activating portion and the other on the portion of said shaft adjacent said other end of said strip.

5. Thermosensitive control apparatus comprising a frame, an elongated thermosensitive strip means secured at one end to said frame and with its other end free of said frame, said strip means having an activating portion movable in response to a temperature change spaced intermediate its ends, a pair of switches each having an actuating member for actuating the switch mounted in said frame on one side of said strip means with the actuating members projecting toward said one side at the activating portion of the strip means, the activating portion of said strip means having a pair of adjustable abutments projecting from said one side each registering with one of said actuating members, a cam shaft rotatably mounted in said frame on the other side of said strip means having portions spaced adjacent the activating portion and said other end of said strip means, respectively, and a pair of cams nonrotatably joined to said cam shaft, one next to and engagable with the activating portion of said strip means and one next to and engagable with a portion of said strip means at said other end, said cams engaging said strip means in sequence on rotation of the cam shaft.

6. Thermosensitive control mechanism comprising a frame, an elongated thermosensitive strip means mounted at one end on said frame and having an activating portion intermediate its ends movable in response to a temperature change, at least a pair of switches each having an actuating member for actuating the switch mounted in said frame on one side of said strip means with the actuating members projecting toward said one side at the activating portion of the strip means, said strip means having cushioning spring means at the activating portion thereof projecting from the other side of said strip means, a cam shaft mounted in said frame adjacent said other side of said strip means extending over said activating portion and the other end of said strip means, and a pair of spaced cams nonrotatably joined to said cam shaft, one of said cams engaging said other end of said strip means and having a relatively small cam offset, the other of said cams engaging said cushioning spring means and having a larger cam offset.

7. Thermostat apparatus comprising an elongated upright frame plate, a cover portion including a front cover wall mounted over the face of the front side of said frame plate, said front cover wall defining the forward limits and said front side of said frame plate defining the rear limits of a relatively thin elongated mounting chamber having a length and breadth measured parallel to the front face of said frame plate, an elongated thermosensitive strip means within said chamber extending longitudinally thereof, said strip means having one end secured to said frame plate and carried in close proximity to said front cover wall and an activating portion spaced longitudinally from said one end free of said frame plate and in close proximity to said frame plate, said activating portion moving toward and away from said frame plate in response to a temperature change, switch means secured to the rear side of said frame plate and having an actuating member for actuating the switch means projecting toward and engaging said activating portion of said strip means, a cam shaft rotatably mounted in said frame plate spaced between said front cover wall and said strip means extending toward said one end and over said activating portion but terminating short of said one end, and a cam nonrotatably joined to said cam shaft moving the activating portion of said strip means.

8. Thermostat apparatus comprising an elongated upright frame plate, a cover portion including a front cover wall mounted over the face of the front side of said frame plate, said front cover wall defining the forward limits and the front side of said frame plate defining the rear limits of an elongated relatively thin mounting chamber having a length and breadth measured parallel to the front face of said frame plate, an elongated thermosensitive strip means within said chamber extending longitudinally thereof, said strip means having an upper end secured to said frame plate and carried in close proximity to the front cover wall of said cover portion, said strip means having a sloping portion sloping inwardly progressing downwardly from its upper end and an activating portion spaced intermediate the ends of the strip means below said sloping portion, said activating portion being free of said frame plate and carried in close proximity to said frame plate, switch means secured to the rear side of said frame plate and having an actuating member for actuating the switch means projecting toward and engaging said strip means at said activating portion, a vertical cam shaft rotatably mounted in said frame plate having a lower end extending outwardly of the lower end of said chamber and an upper end spaced between said front cover wall and said strip means and below said sloping portion, and a cam nonrotatably joined to said cam shaft moving the activating portion of said strip means.

9. The apparatus of claim 8 wherein said frame plate has a pair of laterally opposed vertical flanges opposite the sloping portion of said strip means, one on either side of said strip means, said flanges projecting from said frame plate toward said strip means, and which further comprises a heater element mounted between said flanges.

10. The combination with an electrical space heating device and its supply conductors of a multiple switch heat responsive control unit regulating said space heating device, each supply conductor of said heating device having connected in series therewith one of the switches of said control unit, each of said switches having an actuating member for actuating the switch, said control unit having a common thermosensitive means mounted adjacent the actuating members of all the switches which activates the actuating members of all the switches by movement in a given direction of said thermosensitive means, said control unit having mechanical means for moving the thermosensitive means in said given direction thereby to cause activating of the actuating members of all the switches, said thermosensitive means moving in said given direction by flexing in response to a temperature change.

11. The combination of claim 10 wherein said thermosensitive means includes an adjustable abutment for each switch registering with the actuating member for the switch.

12. The combination with an electrical space heating device and its supply conductors of a multiple switch heat responsive control unit regulating said space heating device, each supply conductor of said heating device having connected in series therewith one of the switches of said control unit, each of said switches having an actuating member for actuating the switch, said control unit having a common thermosensitive strip means mounted adjacent the actuating members of all the switches which activates the actuating members of all the switches by thermally caused flexing in a given direction of said strip means, said control unit having mechanical means for flexing said strip means in said given direction comprising a double cam mechanism mounted adjacent said strip means and having a pair of cam surfaces which engage said strip means, one of said cam surfaces having a greater cam offset than the other of said cam surfaces, said cam surfaces engaging said strip means in sequence.

13. Thermosensitive control apparatus comprising a frame, an elongated thermosensitive strip means secured at one end to said frame and with its other end free of said frame, said strip means having an activating portion intermediate its ends movable in response to a temperature change, a switch having an actuating member for actuating the switch mounted on the frame with the actuating member projecting toward one side of the activating portion of the strip means, an elongated cam shaft rotatably mounted on said frame having a portion spaced adjacent the activating portion of the strip means and another portion spaced adjacent to said other end of said strip means, a pair of cams nonrotatably joined to said cam shaft, one next to and engageable with the activating portion of said strip means and the other next to and engageable with said other end of said strip means, the cam which is engageable with said other end of said strip means producing on rotation of the cam initial movement of said strip means, the other of the cams producing on rotation thereof final movement of said strip means.

14. Thermostat apparatus comprising an elongated upright frame plate having front and rear faces, an elongated thermosensitive strip means extending longitudinally of said frame plate mounted in front of the front face of said frame plate with said strip means spaced throughout its length forwardly of the frame plate, said strip means having a breadth substantially in excess of its thickness and being mounted with the breadth of the plate measured substantially parallel to the front face of the plate, a cover portion including a front cover wall mounted over the front face of said frame plate, said front cover wall defining the forward limits and said frame plate defining the rear limits of an elongated relatively thin chamber containing said strip means, said cover wall being spaced forwardly of said strip means throughout the length of the strip means, the spacing between said strip means and said cover wall on one side of the strip means and between said strip means and said frame plate on the other side of the strip means accommodating free circulation of air on both sides of the strip means, said strip means having a switch activating portion, switch means having a switch body and an actuating member mounted on said frame plate with the switch body projecting rearwardly of the rear face of said plate, the actuating member of said switch means projecting toward said activating portion, and cam mechanism mounted within said chamber for adjusting the position of said strip means.

References Cited in the file of this patent

UNITED STATES PATENTS

| | | |
|---|---|---|
| 2,249,259 | Shaw | July 15, 1941 |
| 2,309,193 | Holmes | Jan. 26, 1943 |
| 2,403,798 | Holmes | July 9, 1946 |
| 2,682,590 | Roberson | June 29, 1954 |
| 2,699,480 | Armstrong | Jan. 11, 1955 |
| 2,719,894 | Allan | Oct. 4, 1955 |
| 2,797,281 | Hajny | June 25, 1957 |
| 2,815,416 | Kumler | Dec. 3, 1957 |
| 2,824,193 | Rosen et al. | Feb. 18, 1958 |